Dec. 27, 1960 T. H. BONN 2,966,662

GATING CIRCUITS EMPLOYING MAGNETIC AMPLIFIERS

Filed Oct. 29, 1954

5 Sheets-Sheet 1

INVENTOR

THEODORE H. BONN

INVENTOR
THEODORE H. BONN

GATING CIRCUITS EMPLOYING MAGNETIC AMPLIFIERS

Filed Oct. 29, 1954 5 Sheets-Sheet 3

INVENTOR
THEODORE H. BONN

INVENTOR
THEODORE H. BONN

Dec. 27, 1960 T. H. BONN 2,966,662

GATING CIRCUITS EMPLOYING MAGNETIC AMPLIFIERS

Filed Oct. 29, 1954 5 Sheets-Sheet 5

INVENTOR

THEODORE H. BONN 2,966,662

GATING CIRCUITS EMPLOYING MAGNETIC AMPLIFIERS

Theodore H. Bonn, Philadelphia, Pa., assignor, by mesne assignments, to Sperry Rand Corporation, New York, N.Y., a corporation of Delaware Filed Oct. 29, 1954, Ser. No. 465,695

22 Claims. (Cl. 340—174)

This invention relates to gating and buffing circuits, and more particularly to such circuits adapted for use as component parts of computing or data translating systems employing magnetic amplifiers.

Heretofore, gating circuits have employed diodes as the principal circuit components, but diodes are likely to fail and it is desirable to reduce the number of them required so far as possible. It is an object of the present invention to reduce the number of diodes required in a gating circuit and to replace some of the diodes with more reliable control devices.

The principal object of this invention is to provide a gating circuit which will operate in a system, the principal components of which are magnetic amplifiers.

Another object of this invention is to provide a gating system that is low in cost.

An additional object of the invention is to provide a gating circuit in which the component parts include magnetic amplifiers, whereby the advantage of that type of component is obtained.

Another object of this invention is to provide a gating circuit that is very efficient and effective in operation.

It is well known that most present-day computing or data translating systems employ vacuum tubes. It is also known that computer engineers are perfecting computers (and data translating systems) employing magnetic amplifiers, of the general types shown in Figures 1 and 12 below, as the principal components thereof. The present invention will have limited applications to such computing or data translating systems. However, the main purpose of the present invention is to provide a new gating system that may be combined with others of the same general type to form a new and simpler computer or data translating system than has heretofore been possible.

Other and more detailed objects and advantages of the invention will be apparent as that description proceeds.

The present application utilizes magnetic amplifiers so connected with the signal or control sources to be controlled and with a source of power pulses, that the power pulses are gated in accordance with information received from the signal sources. The invention involves detailed circuits for this purpose, these circuits being different depending on the particular application with which they are adapted for use. Typical detailed circuits are shown in several of the figures of the attached drawings.

This application is a continuation-in-part of my prior copending application Serial No. 461,968, filed October 13, 1954 entitled: "Gating Circuits Employing Magnetic Amplifiers," assigned to the same assignee as the present application.

Figures 1, 2:
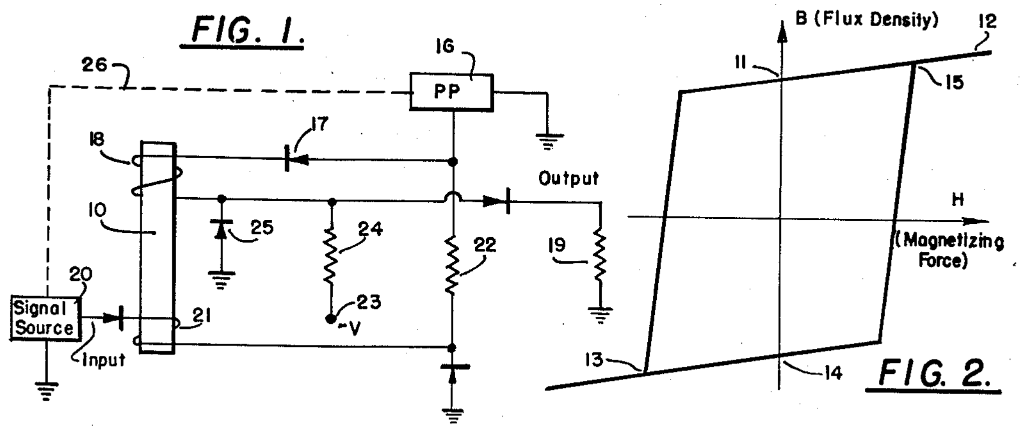
Figure 1 is a schematic diagram of a prior art type of magnetic amplifier.
Figure 2 is a hysteresis loop for core material of the magnetic amplifiers.

The magnetic cores of the several devices hereinafter described can be made of a variety of materials, among which are the various types of ferrites and the various magnetic tapes, including Orthonik and 4–79 Molypermalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips and toroidal-shaped cores are possible. Those skilled in the art understand that when the core is operating on the horizontal (or substantially saturated) portions of the hystersis loop, the core is generally similar in operation to an air core in that the coil on the core is of low impedance. On the other hand, when the core is operating on the vertical (or unsaturated) portions of the hysteresis loop, the impedance of the coil on the core will be high.

In Figure 1, the source 16 of power pulses PP generates a train of equally spaced squarewave pulses having spaces therebetween substantially equal to the duration of the pulses. If it be assumed that at the beginning of any given pulse the core has residual magnetism and flux density, as represented by point 11 of the hysteresis loop of Figure 2, the next power pulse will drive the core from point 11 to point 12, which represents saturation. At the conclusion of the pulse the magnetizing force will return to point 11. Successive pulses from power source 16 will flow through rectifier 17, coil 18 and load 19, repeatedly driving the core from point 11 to point 12. During the interval in which the core is being driven from 11 to 12, the core is operating on a relatively saturated portion thereof, whereby the impedance of coil 18 is low. Hence, power pulses will flow from source 16 to load 19 without substantial impedance. If, during the interval between two power pulses, a pulse is produced at the input source 20, it may pass through coil 21, resistor 22, source 16, to ground. This will magnetize the core negatively driving it from point 11 to point 13. At the conclusion of this negative pulse the core will return to point 14 where the magnetizing force is zero. The next power pulse from source 16 is just sufficient to drive the core from point 14 to point 15. Since this is a relatively unsaturated portion of the core, the coil 18 will have high impedance during this pulse and the current flow will be very low. At the conclusion of that pulse the magnetization will return to zero value 11. If no signal appears on the input immediately following the last-named power pulse, the next power pulse will drive the core to saturation at point 12 and will give a large output at the load 19.

Consequently, it is clear that the magnetic amplifier of Figure 1 will feed large pulses to the load in response to each pulse from source 16, except that immediately after the receipt of any pulse on the input 20 the next power pulse will be blocked.

In order to avoid appearance at the load 19 of the small current which flows during the period that a power pulse is driving the core from point 14 to point 15, the negative source 23, resistor 24 and rectifier 25 may be employed. Sufficient current flows through rectifier 25, resistor 24 and source 23 that the small current from coil 18 to output 19 is cancelled.

The output of source 16 is an alternating current and goes negative between positive pulses. The negative pulse more than cancels any potential induced in coil 18 due to signal currents flowing through primary 21. As a result, the negative excursions of source 16 render the anode of rectifier 17 negative and cut off that rectifier.

Figure 3:
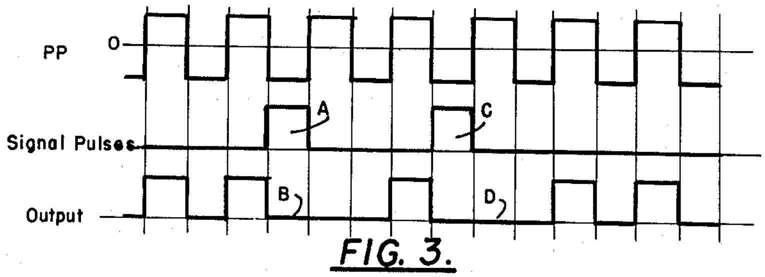
Figure 3 illustrates the waveforms of the signals involved in Figure 1.

In one form of the device, coil 18 has twice the number of turns as coil 21 and the pulses from source 16 have twice the electrical potential of the pulses on input 20. The source 16 of power pulses, and the signal source 20 are so synchronized by any suitable means 26, that the signal pulses always occur during the spaces between power pulses. As shown in Figure 3, the signal pulses A and C, as do all other signal pulses, occur at times when the power pulses PP are at zero or at negative values. It follows from the foregoing description of Figure 1 that there will be a continuous train of power pulses in the output except during those intervals B and D which immediately follow the signal pulses A and C.

In some of the magnetic amplifiers hereinafter described, the means 23, 24 and 25 for suppressing the "sneak" current has been omitted from the drawings and description, but could be added if desired.

The device of Figure 1 just described, per se, is not part of the invention. It has been described primarily as background information and secondarily since the circuit of Figure 1 is incorporated as a component part of some of the more complex circuits hereinafter described. The device of Figure 4, now to be described, embodies a basic and important concept and constitutes one form of the invention.

Figure 4:
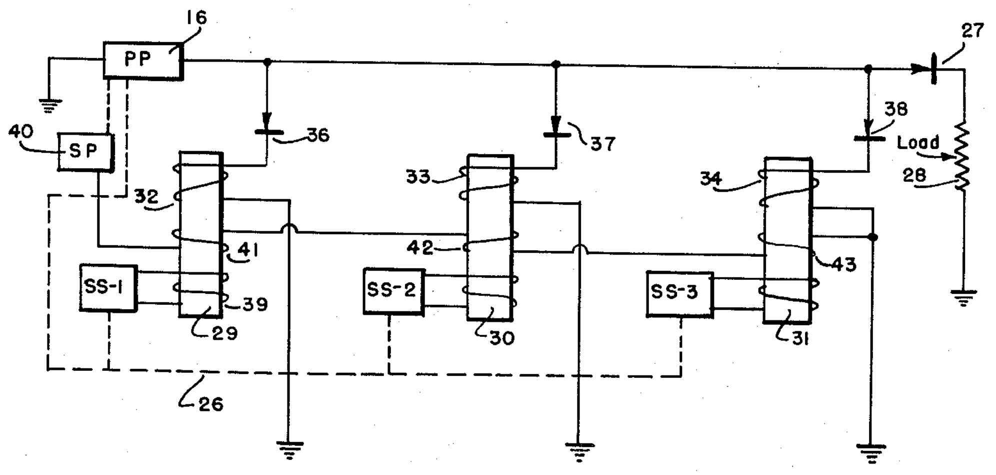
Figure 4 is a schematic diagram of a parallel gating or buffing circuit in which predetermined signals on all three of the signal sources SS–1 to SS–3 inclusive must be concurrently present before current will flow to the load.

Figure 4 illustrates a gating circuit in which a predetermined signal on any one of three signal sources SS–1 to SS–3 inclusive will prevent power pulses from flowing to the load. Power pulses PP from source 16 may normally flow through rectifier 27 to the load 28. If, however, any one or more of magnetic amplifiers 29, 30 or 31 has been rendered conducting by its complementary signal source SS, the current from the source 16 will be effectively grounded and no signal will appear at the load 28. Assume that the magnetization and residual flux density of each of cores 29, 30 and 31 is at point 11 on the hysteresis loop, successive pulses thereafter from the source 16 will flow through the coils 32, 33 and 34 without substantial impedance. Hence, there will be substantially no output at the load 28. If, however, between two power pulses, signal pulses are simultaneously produced at all of signal sources SS–1, SS–2, and SS–3, all three cores 29, 30 and 31 will be flipped to the point 14 on their respective hysteresis loops. Hence, the next power pulse will encounter high impedance in the coils 32, 33 and 34 relative to the impedance of the load 28, and therefore only a small amount of current will flow through these coils. It follows that there will be a large output current in the load 28 conforming to the last-mentioned power pulse. It is also true that if any one of the cores 29, 30 or 31 is at point 11 on the hysteresis loop at the beginning of any given power pulse from source 16, that particular power pulse will be effectively grounded and no output will appear therefrom at the load 28. Consequently, the circuit of Figure 4 acts as a gating circuit by permitting substantially current to flow from the source 16 to the load 28 only under the special circumstances where all three sources SS–1, SS–2, and SS–3 have, during the immediately preceding time period, magnetized their respective cores 29, 30 and 31 negatively from point 11 to point 13 on the hysteresis loop. This gating circuit is therefore one in which it is necessary for signals to appear on all three of sources SS–1, SS–2 and SS–3 during the period immediately preceding any given power pulse in order for that power pulse to energize the load.

For best results, in this form of the invention the source 16 should have high internal resistance as compared to the load, whereby it is essentially a constant current pulse source. In other words, it is essentially a constant potential source when there is no load current; but it has very poor voltage regulation when the load impedance is lowered whereby the output current is constant. When this is the case, a low impedance in any one of the coils 32, 33 and 34 will shunt practically all the current away from the load. Moreover, source 16 is an alternating current source whereby it has both positive and negative excursions for purposes that will soon appear.

Rectifier 36 enables coil 32 to conduct current from source 16 to ground when coil 32 has low impedance. This rectifier 36, in combination with the negative portions of the power pulse, also prevents any potential induced in coil 32 by current flowing through coil 39 from source SS–1 from causing current to flow in coil 32. Rectifiers 37 and 38, function, with reference to coils 33 and 34 respectively, the same as rectifier 36 functions with reference to coil 32. Rectifiers 36, 37, and 38 also function to block the flow of current in windings 32, 33, and 34 as a result of current induced in any one of them. Rectifier 27 blocks any flow of current to load 28 during the negative portions of the pulses from source PP. Rectifier 27 also blocked current flow in the load 28 as a result of current induced in windings 32, 33, and 34.

It is desirable that the cores 29, 30 and 31 be at positive remanence point 11 on the hysteresis loop at the conclusion of each positive half cycle of the source 16. This would not always be the case in the absence of coils 41, 42 and 43. For example, if cores 29 and 30 were not reverted over a substantial period of time so that coils 32 and 33 had very low impedance while coil 34 had high impedance, the core 31 might remain in a reverted condition even though no reverting currents were supplied to it, except for the coil 43.

The function of coils 41, 42 and 43 is to supply positive magnetizing forces substantially equal to the coercive currents of their respective cores. In other words, they provide magnetizing forces which in the absence of other magnetizing forces are just equal to that necessary to drive the core from point 14 to point 15 on the hysteresis loop of Figure 2. They are supplied with setting pulses from source 40; and these setting pulses may be positive and occur concurrently with positive excursions of source 16. Moreover, the setting pulse source 40 is a constant current source so that the pulses flowing through coils 41, 42 and 43 always have the same amplitude. Therefore the current flowing through said coils 41 to 43 inclusive always drives the cores 29 to 31 inclusive at least to point 15 on the hysteresis loop of Figure 2, even though the coils 32, 33 and 34 have high impedance. If, in addition to the setting magnetizing forces in one of coils 41 to 43 inclusive, for example coil 41, the power winding 32 has low impedance at the same time so that a large positive power pulse flows therethrough, the core will be driven beyond point 15 and into the region of saturation 12 of Figure 2.

In the several forms of the invention hereinafter disclosed, other coils, the equivalent of coils 41 to 43, are often included and bear similar reference numbers to their complementary coils of Figure 4. A detailed discussion of the function of these coils in the other figures is not given since it is the same as has just been described in connection with Figure 4. However, it is not always necessary to employ a separate source 40 for supplying the pulses for coils 41 to 43 inclusive. For example, in Figure 5, these pulses are derived from the source 16 by including a high resistance element 44 in series with a rectifier 45. If the resistance of element 44 is high enough the current through the circuit will be substantially constant notwithstanding variations in the impedance of the coils 41 to 43 inclusive, and therefore the circuit will operate as a constant current circuit and the coils 41 to 43 inclusive will produce constant magnetizing forces of the proper value. The rectifier 45 will insure that the pulses occur only when source 16 is positive.

Figure 5:
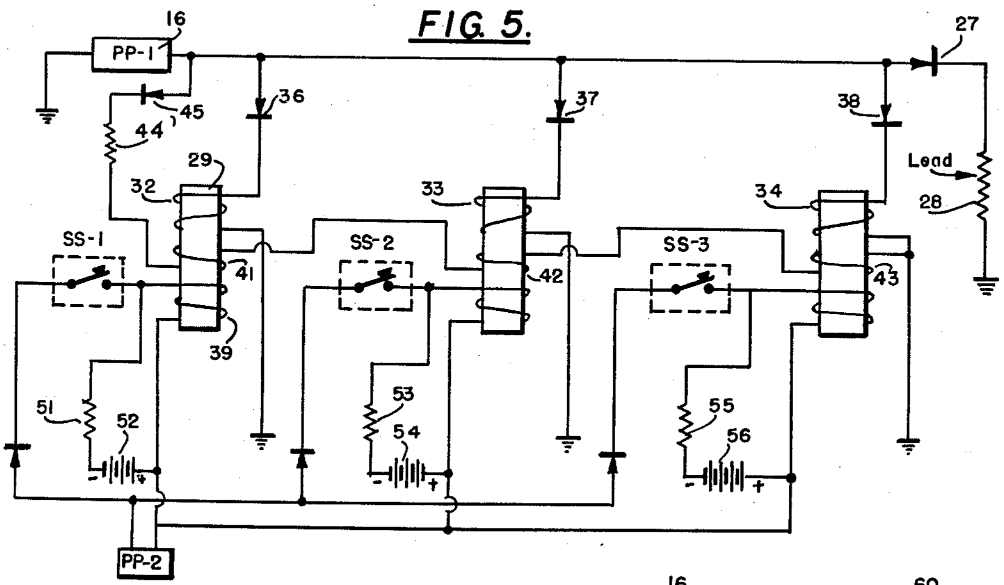
Figure 5 is a modified form of Figure 4 in which a signal from any one of the signal sources SS–1 to SS–3 inclusive will effectively short-circuit the load and preclude flow of current therethrough.
Figure 11:
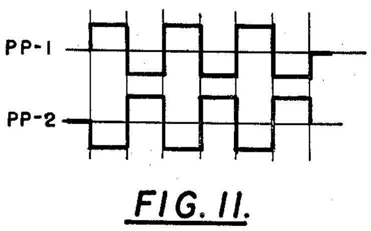
Figure 11 is a waveform diagram showing the relation of the power pulses of the devices of Figures 5, 7, 9 and 10.

Figure 5 is a modified form of Figure 4 in which like reference numbers represent like parts. There are more details in connection with Figure 5 than in connection with Figure 4 and these bear new reference numbers. In Figure 5, there are two sources of power pulses PP–1 and PP–2 which have waveforms as shown in Figure 11. Each of these generators produces an output of spaced pulses and the positive pulses of each generator occur during the gaps between positive pulses of the other generator. The input windings of the three magnetic amplifiers are all fed with pulses from source PP–2 and therefore the control signals on all three magnetic amplifiers occur during the gaps between the positive power pulses of source PP–1. The signal sources SS–1, SS–2 and SS–3 are represented by single pole, single throw switches in series with the source PP–2. This is purely diagrammatic in character for the reason that in an actual computing circuit or data translating system some element of the system would normally control the flow of pulses from source PP–2 to the input winding, for example winding 39. Resistors and batteries 51 to 56 are optional and cause a different mode of operation, and for the purposes of the present explanation it will be assumed that these parts 51 to 56 inclusive are all omitted. If it be assumed that any one of the switches, for example switch SS–1, is open, no current will flow from source PP–2 to the control winding 39 during the spaces between power pulses of source PP–1 and therefore the pulses from that source will flow through rectifier 36, coil 32, to ground, saturating the core 29 and effecting low impedance in coil 32. Hence, the pulses from constant current source 16 are effectively grounded through coil 32 and there is very little flow of current to the load 28. If, however, switch SS–1 is closed (the resistor 51 and battery 52 being omitted), pulses from source PP–2 will flow through coil 39 and reset the core 29 during the spaces between power pulses from source PP–1, wherefore coil 32 will have high impedance. If switches SS–2 and SS–3 are similarly closed (parts 53 to 56 inclusive being omitted), coils 33 and 34 will likewise have high impedance and any pulses appearing at source PP–1 will flow through rectifier 27 to the load 28.

If elements 51 to 56 are used, the sense of the input windings must be the reverse of the sense shown.

If it now be assumed that parts 51 to 56 inclusive are added to the device as shown in Figure 5, and if the input windings all have the winding sense reversed as noted above, the operation will be the same as heretofore except that the effect of opening and closing the switches is reversed. Assuming switch SS–1 to be open, a current from battery 52 flowing through resistor 51 and coil 39 will reset the core 29 during the spaces between power pulses and thus cause coil 32 to have high impedance to each and every pulse from source PP–1. If then switches SS–2 and SS–3 are similarly open, all three coils 32, 33 and 34 will have high impedance and pulses from source PP–1 will flow to the load 28. If one of the switches, for example SS–1, is closed, pulses from source PP–2 will cancel the effect of battery 52 during the limited period between the spaces of pulses from source PP–1, and therefore the core 29 will not be reset during the spaces between pulses of source PP–1. That will cause coil 32 to acquire low impedance, since the pulses from source PP–1 flowing through that coil will saturate the core 29 and shunt the current from source PP–1 away from the load 28.

It follows that in the device of Figure 5, as shown, but with the input winding sense reversed as noted, if any one of the switches SS–1 to SS–3 inclusive is closed, there will be no flow of current to the load 28. If the switches are all open, there will be a flow of current to the load 28.

As in the case of Figure 4, the rectifiers 36, 37 and 38 allow pulses from source PP–1 to flow through coils 32, 33 and 34 respectively when those coils have low impedance. It is clear that the source PP–2 forcing current through, for example, coil 39, may induce potentials in coil 32 at times and in order to prevent flow of current due to such induced potentials, the rectifiers 36, 37 and 38 have been added.

Figure 6:
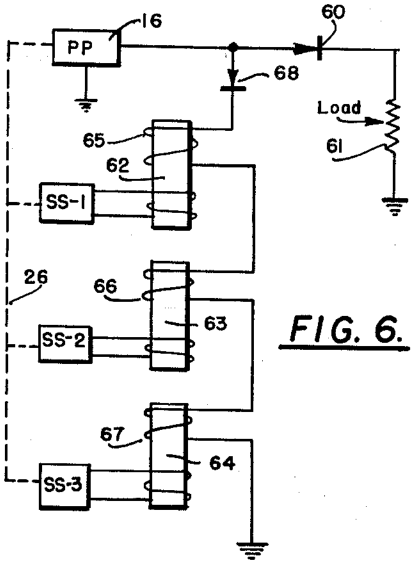
Figure 6 is a schematic diagram of a modified form of the invention in which a group of power windings are in series with each other, the group being in parallel with the load.

Figure 6 is a schematic diagram of another form of gating circuit in which coils 65, 66 and 67 are in series with each other but considered as a group are in parallel with the load 61. The source 16 is preferably a constant current pulse source the same as used in connection with Figure 4. Pulses normally flow from source 16 to the load 61 through rectifier 60. However, when all three power windings 65, 66 and 67 concurrently have low impedance, current from source 16 is shunted through rectifier 68, coils 65, 66 and 67 to ground and hence very little current flows from source 16 to the load 61. If the residual flux density and magnetizing forces on the three cores 52, 53 and 54 are at point 11 on the hysteresis loop, the next power pulse from source 16 will flow through the coils 65, 66 and 67 to ground. Hence, there will be little if any current in the load 61. However, if any one or more of the cores 62, 63 or 64 has been flipped to point 14 before the occurrence of a given power pulse, that power pulse will encounter high impedance in the coil of the core which has been so flipped. Hence, substantially full power of the pulse will appear at load 61. Consequently, if during the interval between two power pulses any one or more of signal sources SS–1, SS–2 and SS–3 has produced a signal in its complementary magnetizing core, it will flip its complementary core to point 14 and render the power winding (65, 66 or 67 as the case may be) one of high impedance and thus prevent the source of power pulses 16 from being effectively grounded. It follows that Figure 6 is a series gating circuit since a pulse output from any one of the several signal sources will effect a flow of current to the load.

Figure 7:
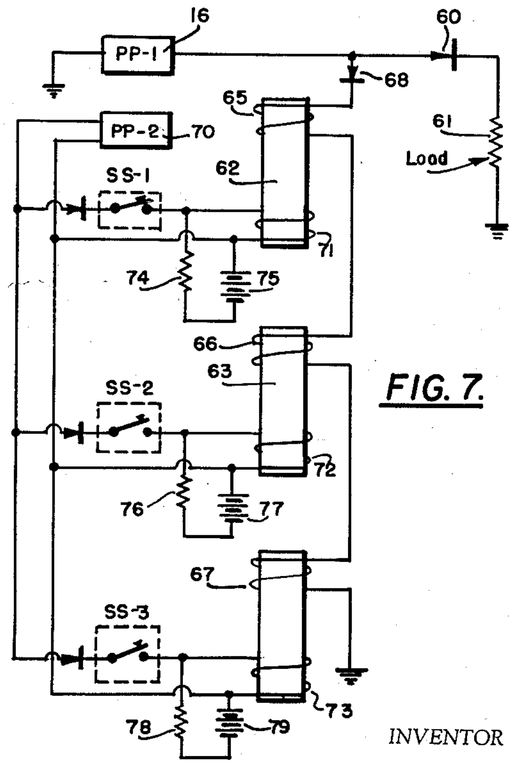
Figure 7 is a schematic diagram of a modified form of Figure 6.

Figure 7 is a modified form of Figure 6 in which it is shown that the input to control windings 71, 72 and 73 may be controlled by switches SS–1 to SS–3 inclusive. Two power pulse sources 16 and 70 are provided, the same as in connection with Figure 5, and these sources produce pulses having the waveform shown in Figure 11. In other words, each source produces pulses that occur during the gaps between the pulses of the other source. It follows that any pulses from source 70 to the primary windings 71, 72 or 73 will occur during the spaces between pulses of source 16. If it first be assumed that resistors and batteries 74 to 79 inclusive are omitted, the flow of current from source 70 to primaries 71, 72 and 73 is controlled by switches SS–1 to SS–3 inclusive. If any one of these switches is closed, its complementary primary winding will be energized by a pulse during each space between pulses of source 16. Therefore, the core will be reset during the spaces between power pulses of source PP–1 and the coil on the core will have high impedance. High impedance in any one of the coils 65, 66 and 67 will prevent the load from being effectively short-circuited. If it now be assumed that all three switches SS–1 to SS–3 inclusive are open, none of coils 71 to 73 inclusive will receive any current during the spaces between pulses of source PP–1 and all three cores 62, 63 and 64 will be driven to saturation by virtue of the next pulse from source PP–1 flowing through coils 65, 66 and 67 to ground. Since the source 16 is a constant current source as heretofore explained, substantially all of its current will be shunted through coils 65, 66 and 67, which have low impedance, to ground and very little of the current will flow to the load 61, which of course has high impedance as compared to that of the aforesaid coils 65 to 67 inclusive.

If it now be assumed that resistors and batteries 74 to 79 inclusive are included in the circuit, and if the sense of windings 71, 72 and 73 be reversed, the effect of opening and closing the switches SS–1 to SS–3 inclusive is reversed. For example, battery 75 will force flow of current through resistor 74 and coil 71 during the spaces between power pulses of source PP–1 and will normally reset the core (assuming switch SS–1 to be open), wherefore coil 65 will have high impedance. Similarly, if switches SS–2 and SS–3 are open, coils 66 and 67 would have high impedance. If switch SS–1 is closed the pulse from source 70 flowing through switch SS–1 will cancel the effect of battery 75 and no current will flow in coil 71 during the spaces between power pulses of source PP–2. Therefore, the core 62 will not be reset during that period and subsequent pulses from source 16 flowing through coil 65 may drive the core 62 to saturation. If all three switches SS–1 to SS–3 inclusive are closed, none of the cores 62 to 64 inclusive will be reset during the spaces between pulses of source PP–1 and the next pulse from that source will flow through coils 65, 66 and 67 in series, saturating all of the cores and effectively shunting all of the current from source 16 to ground. The load 61 which has higher impedance than the coils 65 to 67 inclusive (when the latter have low impedance), will therefore receive very little current.

In Figures 6 and 7, rectifier 68 is employed to allow pulses from the source 16 to flow through the coils 65, 66 and 67, but to block flow of current due to potentials that may be induced in those coils. For example, assuming the case of Figure 7 where the batteries 74 to 79 inclusive are all omitted and all three switches SS–1 to SS–3 inclusive are closed, the windings 71 to 73 inclusive would receive pulses and would act as primary windings inducing potentials in secondaries 65, 66 and 67 during the spaces between the pulses of source PP–1 and if it were not for rectifier 68, current would flow. However the rectifier 68 blocks such flow of current.

In Figures 6 and 7 no coils serving the function of coils 41 to 43 inclusive of Figure 4 are shown since such coils would be of little value in connection with Figures 6 and 7. The number of volt-seconds of each positive pulse of source PP–1 of these figures may be so predetermined that all three cores 62, 63 and 64 will be at plus remanence (point H of Figure 2), at the end of each positive power pulse no matter what the previous conditions obtained at the input signal sources SS–1 to SS–3 inclusive.

Figure 8:
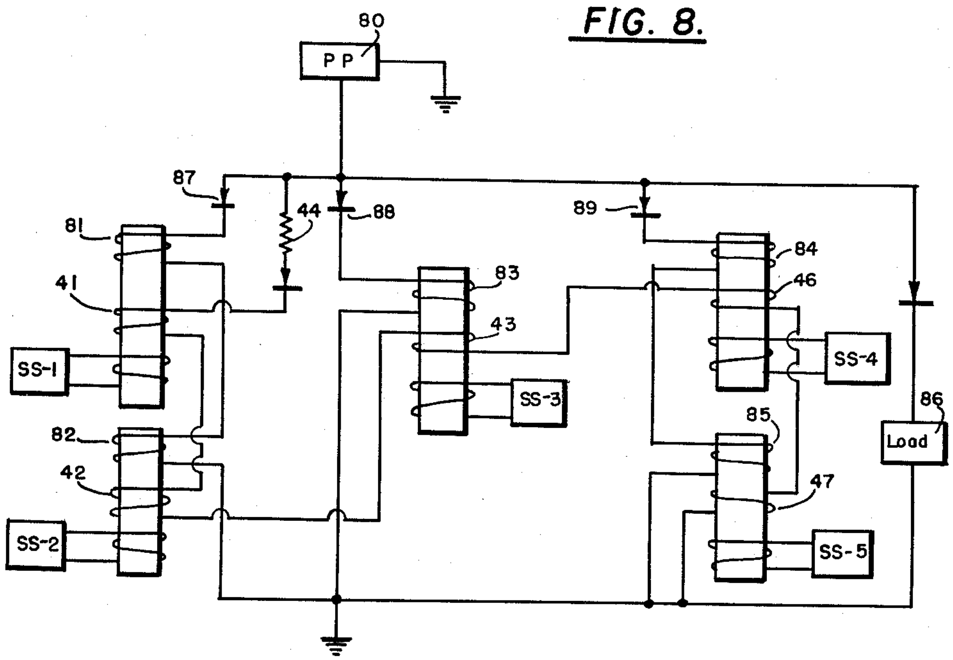
Figure 8 is a modified form of the invention in which there are a plurality of parallel branch circuits, one of which includes the load, another two of which include the power windings of two magnetic amplifiers in series, and the fourth of which includes the power winding of a single magnetic amplifier.

Figure 4 shows several parallel branch circuits, each including a power winding of a magnetic amplifier in parallel with the load. Figure 6 on the other hand, shows a group of power windings connected in a series, the group being effectively in parallel with the load. It is understood that so far as the invention is concerned, there could be a combination of the circuits of Figures 4 and 6 wherein there was a plurality of branch circuits in parallel with the load, each of these branch circuits having one or more power windings therein connected in series with each other. Figure 8 shows one illustration of such a combination. The first branch circuit contains two power windings 81 and 82 in series. The second branch circuit has a single power winding 83. The third branch circuit has two power windings 84 and 85 in series. It is understood that any number of branch circuits may be employed, each of which may have any number of power windings in series with each other. Normally, each branch circuit should have a rectifier such as rectifiers 87, 88 and 89 in series with it to allow pulses from the source 80 to flow to ground whenever the particular branch circuit concerned has low impedance. These rectifiers, as in the case of Figures 4 and 6, block flow of any current due to potentials induced in the several power windings due to energization of the input windings of the amplifiers and thus prevent flow of such induced current to the load 86. In the device of Figure 8, if any one branch circuit has low impedance in all of the power windings connected therein, current from the constant current pulse source 80 will be substantially all shunted through that particular branch circuit and there will be very little current to the load 86. For example, if sources SS–1 and SS–2 do not have pulses at a given period so that the next power pulse from source 80 flows through coils 81 and 82 and saturates the cores of the first branch of the circuit, substantially all the current from source 80 will flow through the first branch of the circuit and very little of it will flow through the load 86. If source SS–3 does not reset its core during the space between power pulses, the coil 83 will have low impedance and alone will shunt substantially all of the current away from the load.

If all three branch circuits have high impedance, then there will be substantial flow of current to the load. For example, assume that sources SS–1, SS–3 and SS–4 all simultaneously reset their respective cores during the space between two power pulses of source 80. Then coils 81, 83 and 84 will all have high impedance to the next power pulse and substantially all of the current of that next power pulse will flow to load 86.

It is understood in connection with Figure 8 that all of the various modifications suggested in connection with Figures 4 and 6 may be made in conjunction with Figure 8. For example, the sources SS–1 to SS–5 inclusive of Figure 8 may be any form of electrical switches or control devices that control the flow of current from a second source of power pulses to the primary windings. Similarly, there could be added the resistors and batteries such as resistor 74 and battery 75 of Figure 7 (it being, again, necessary to reverse the input winding sense) so that the cores would be automatically reset during the spaces between power pulses, in the absence of a pulse from the associated signal sources.

Figure 9:
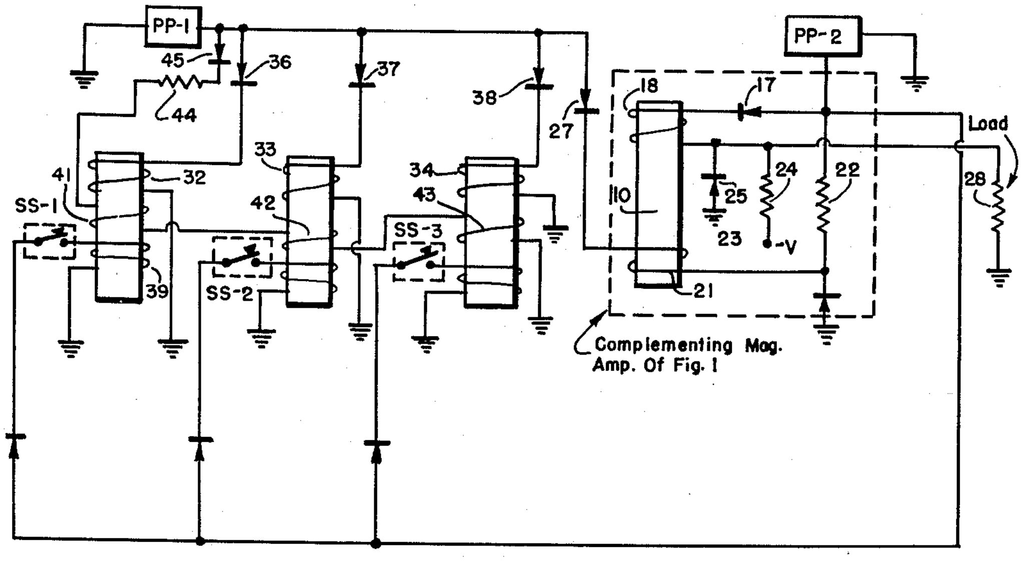
Figure 9 is a schematic diagram of a modified form of the invention of Figure 4 in which a complementing magnetic amplifier as shown in Figure 1 is placed in the output thereof in order to reverse the character of the output signals.

Figure 9 illustrates another modification of Figure 4, but it is understood that this same modification may be applied to any of Figures 4 to 8 inclusive. Figure 9 is essentially the same as Figure 5 (omitting elements 51–56) and like reference numbers represent like parts, except that a complementing magnetic amplifier of the type shown in Figure 1 is placed in series with the load. A second power pulse PP–2 whose pulses are related to those of source PP–1, the same as shown in Figure 11, is employed. It feeds pulses to the complementing magnetic amplifier as well as to sources SS–1 to SS–3 inclusive. During the spaces between pulses of source PP–1, the switches SS–1 to SS–3 inclusive control the flow of control pulses from source PP–2 to the several input windings on the core. This operation is the same as was described in conjunction with Figure 5 when the resistors and batteries of that figure were omitted. Consequently, if any one of the three switches SS–1 to SS–3 remains open, its complementary coil 32 to 34 inclusive will have low impedance and the constant current from source PP–1 will be shunted through the power winding to ground. There will consequently be no pulse at the input winding 21 of the complementing magnetic amplifier. As previously explained in connection with Figure 1, whenever there is no pulse at the input of the complementing magnetic amplifier of that figure, the next power pulse from source PP–2 fed to the complementing magnetic amplifier will pass therethrough to the load 28. It follows that if switch SS–1, for example, is open, coil 32 will have low impedance and the next pulse from source PP–1 will flow through coil 32 to ground and will not flow through to coil 21. Therefore the next pulse from source PP–2 will find coil 18 having low impedance and will flow therethrough to the load.

In event all three switches SS–1 to SS–3 inclusive are closed, pulses from source PP–2 will flow through all three switches and reset all three cores during the spaces between power pulses of source PP–1, wherefore all three coils 32, 33 and 34 will have high impedance to the next pulse from source PP–1. Consequently, the pulses from that source will readily flow through coil 21, resistor 22, source PP–2, to ground. This will reset the core 10 during the spaces between pulses of source PP–2 wherefore the pulses from that source will encounter high impedance in the coil 18 and no pulses will flow to the load 28.

The arrangement shown in Figure 9 of including a complementing magnetic amplifier fed by a source PP–2 in series with the load may be applied to any one of Figures 4 to 8 inclusive and wherever applied will have the effect of reversing the operation at the load. In other words, if without the complementing magnetic amplifier in the load circuit, the load would normally receive a train of pulses at a given time, it will not receive such pulses if the complementing magnetic amplifier is included in the circuit and vice versa.

Figure 10:
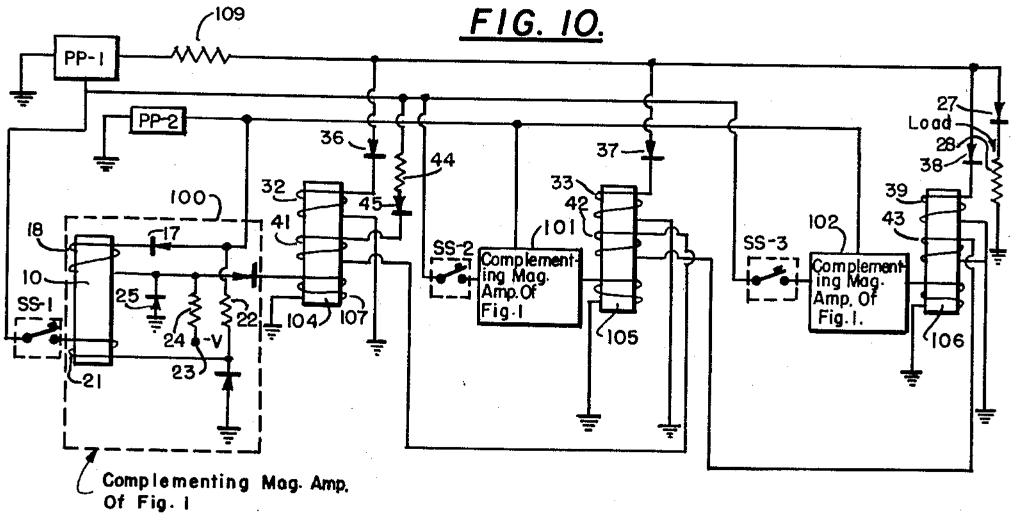
Figure 10 is a schematic diagram of another modified form of Figure 4 in which complementing magnetic amplifiers such as are shown in Figure 1 are interposed in the input of each of the magnetic amplifiers 32, 33 and 38 so as to reverse the effects of the inputs upon the load.

Figure 10 shows a still further modified form of Figure 4 in which the complementing magnetic amplifiers are included between the switches SS–1 to SS–3 inclusive and their complementary control windings. The complementing magnetic amplifier 100 is shown schematically in detail, similar reference numbers on Figures 1 and 10 representing similar parts.

Complementing magnetic amplifiers 101 and 102 are shown in block form and would normally be connected the same as amplifier 100. In event switches SS–1 to SS–3 are all open, coil 18 in each of amplifiers 100, 101 and 102 will have low impedance to the next pulse from source PP–2 and that pulse will reset the cores 32, 33 and 39, wherefore substantially all of the current from source PP–1 will flow to the load. In this case source PP–1 is essentially a constant potential source but it has two output connections, one of which feeds the three switches SS–1 to SS–3 inclusive. These switches are fed therefore by a source of essentially constant potential irrespective of the load placed thereon. However, source PP–1 has a high resistance element 109 in series with the load 28, and the coils 32, 33 and 39, and therefore so far as those elements are concerned the source PP–1 is essentially a constant current source. Assuming the switches SS–1 to SS–3 inclusive are all open, none of the input windings such as 21 of the amplifiers 100, 101 and 102, will be energized by pulses from source PP–1 and hence coils such as 18 of amplifiers 100, 101 and 102 will have low impedance to the next pulse from source PP–2. That pulse will reset the cores 104, 105 and 106 and thereby cause coils 32, 33 and 39 to have high impedance, therefore current from source PP–1 will flow through high resistance 109 and the load 28, energizing the latter. In event one of the switches SS–1 to SS–3 is closed, the operation will be as follows: If switch SS–1 is closed, current will flow from source PP–1 through coil 21, resistor 22, source PP–2, to ground. This will reset the core 10 during the spaces between power pulses of source PP–2 and render the coil 18 of high impedance to the next pulse from source PP–2. Consequently, coil 107 will not be energized during the spaces between pulses of source P–1 and the core 104 will be saturated by those pulses flowing through coil 32. Coil 32 will have low impedance and shunt practically all of the current flowing through resistor 109 to ground. Consequently, very little current will flow to the load 28. The same result would occur in event either of the switches SS–2 or SS–3 is closed.

In order to illustrate a practical application of the invention, I will illustrate the same as replacing a conventional gate in a modern type half-adder.

Figure 12:
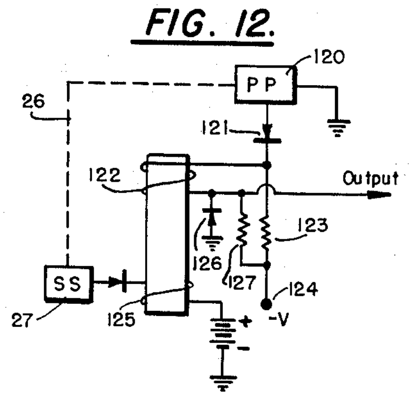
Figure 12 is a schematic diagram of a non-complementing magnetic amplifier useful in explaining the circuit of Figure 13.
Figure 13:
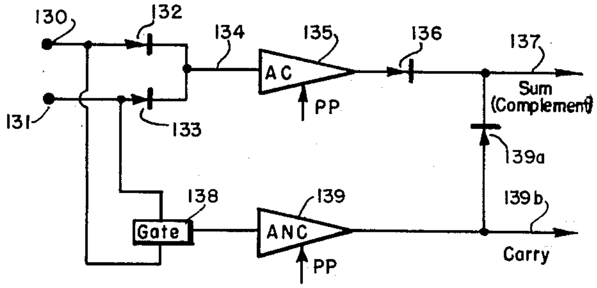
Figure 13 is a block diagram of a half-adder employing a gate. This figure is not part of my invention but is included for purposes of enabling me to point out how one of my novel gates may replace the conventional gate of this circuit.

In order to understand the half-adder circuit shown in Figure 13 it is first desirable to explain the operation of a non-complementing magnetic amplifier. A typical non-complementing magnetic amplifier is illustrated in Figure 12 and employs a source 120 producing an uninterrupted train of power pulses which are equally spaced and generally the spaces between the pulses are equal to the duration of the pulses. The signal source 127 produces from time to time the control signals and by reason of any suitable means 26, these control signals are always synchronized to appear during spaces between the power pulses. When the power pulses from source 120 are positive they pass through rectifier 121, coil 122, resistor 127 to negative pole 124 which is below ground potential. If we assume that at the start of the first pulse the core was at point 14 on its hysteresis loop (see Figure 1), it will be driven to point 15. At the end of this pulse it will return to zero value 11. At the conclusion of the first pulse, current will flow in the following circuit: from ground to rectifier 126, coil 122, resistor 123, to negative pole 124. This is a current flow through coil 122 in the opposite direction from that of the first pulse and drives the core negatively from point 11 to point 13. At the conclusion of this reverse pulse, the second power pulse will drive the core positively from point 13 through point 14 to point 15, and from thence it will go to 11, after the conclusion of the second pulse. The next action will be another flow of current in the following circuit: from ground, rectifier 126, coil 122, resistor 123, to negative pole 124.

Hence, the magnetization of the core will repeatedly traverse the hysteresis loop and the majority of the time the core will be operating on unsaturated portions of the hysteresis loop, consequently there will be substantially no output. If, however, an input signal is received in coil 125, at a time when the core is at point 11, the reverse current (in circuit: ground 126—122—123—124) will not drive the core negatively to point 13 as usual. In such situation, there will be two opposite magnetizing forces on the core. On the one hand, there will be a flow of current in the circuit: ground, to rectifier 126, coil 122, resistor 123, to negative pole 124, tending to apply a negative magnetizing force to the core. There will be an additional input current in coil 125 tending to apply a positive magnetizing force to the core. These two magnetizing forces will cancel each other and the core will remain at point 11 on the hysteresis loop. Consequently, the next power pulse will pass through rectifier 121 and coil 122 to the output. It will drive the core from point 11 to point 12 on the hysteresis loop. The core is substantially saturated throughout this entire period, and therefore a large pulse output will appear. The operation of the non-complementing amplifier may be summarized by stating that the currents will drive the core around the hysteresis loop without substantial saturation and therefore without any substantial pulse output until there is a current flow through coil 125. This will interrupt the alternating magnetizations of the core, allowing the next power pulse to saturate the core and give a large output.

Figure 14:
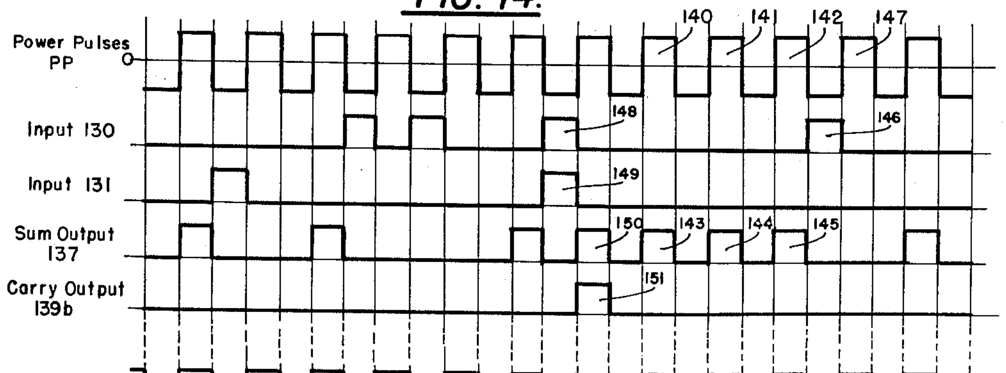
Figure 14 is a waveform diagram of the device of Figure 13.

Figures 13 and 14 illustrate a half-adder such as may be employed in the present invention, and wherever in the following description of those figures reference is made to a complementing magnetic amplifier, it is understood that such amplifier may be of the type shown in Figure 1 of this application; and wherever reference is made to a non-complementing magnetic amplifier it is understood that the amplifier of Figure 12 may be used.

Referring now to the block diagram of Figure 13, it is noted that the complementing magnetic amplifier 135 passes a continuous series of power pulses PP–1 through buffer 136 to the "sum" output 17, in the absence of signals on wire 134. The two binary signals to be added, which may have the waveforms shown in Figure 14, are fed to terminals 130 and 131 from a magnetic store or other element. If there is a signal on either one of these inputs 130 or 131, the next succeeding power pulse from amplifier 135 is interrupted. This is clearly illustrated in Figure 14 where it is noted that power pulses PP–1 occur at 140, 141 and 142 respectively, producing "sum" output pulses at 143, 144 and 145. However, when input pulse 146 occurs at input 130, the next succeeding power pulse 147 does not flow to the "sum" output 137. When input pulses occur simultaneously at input terminals 130 and 131, the diode gate 138 becomes conducting and triggers the non-complementing magnetic amplifier 139 so that the latter allows the next power pulse to flow to the "carry" output 139*b* and to the "sum" output 137. This is clearly illustrated in Figure 14 which shows the inputs 130 and 131 as having received input pulses 148 and 149. These cause a pulse 150 at the "sum" output 137 and a pulse 151 at the "carry" output 139*b*.

It follows from the foregoing that when there is no signal on either input, there will be no signal at the "carry" output 139*b* and there will be a continuous series of power pulses at the "sum" output 137. When there is a pulse on just one of the input terminals 130 or 131, there will be a pulse on wire 134 which will interrupt the next power pulse from amplifier 135 and give an indication in the "sum" output 137 by the absence of a pulse. When there are simultaneous input pulses on both terminals 130 and 131, the amplifier 139 allows the next power pulse to pass to the "carry" output 139*b*, indicating a "carry" digit and also to pass to the "sum" output 137 indicating the lack of a sum.

The gate 138 of Figure 13 is the important element so far as the present application is concerned, inasmuch as the present application discloses a novel gate which may be substituted for the gate 138 of Figure 13. In Figure 13 the gate 138 produces an output pulse only when there are concurrent input pulses on input wires 130 and 131. In other words, in event there are simultaneous input pulses on wires 130 and 131, the gate will supply an input pulse to amplifier 139.

Figure 15:
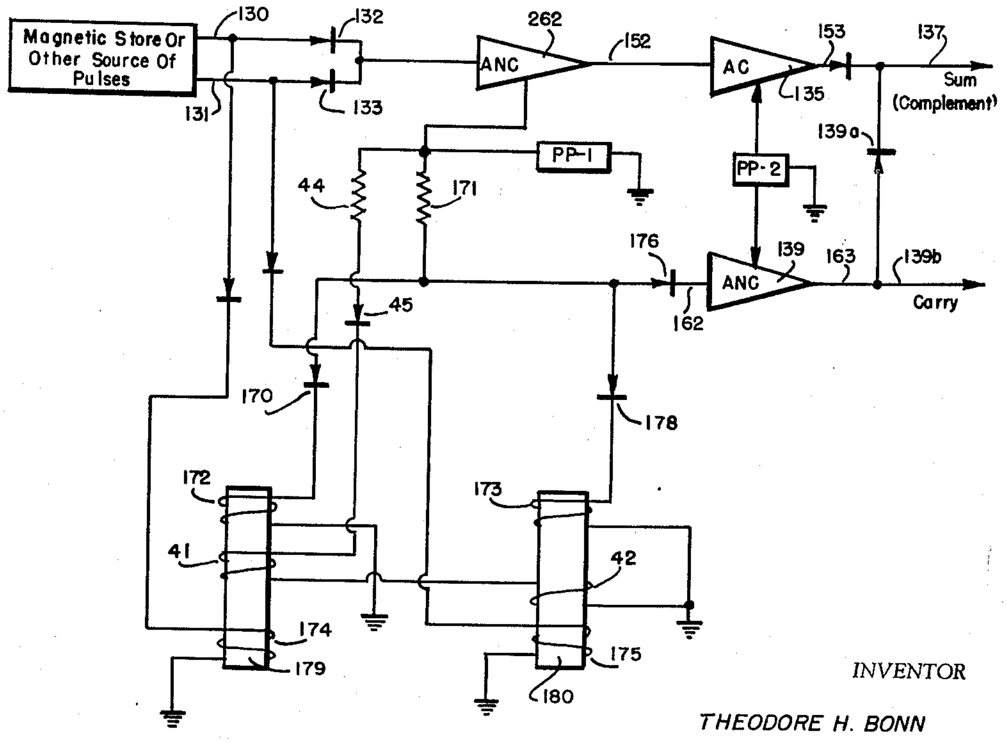
Figure 15 is partly a block and partly a schematic diagram of the half-adder of Figure 13 with my novel gate shown in place of the conventional gate of Figure 13.

Figure 15 is a semi-schematic diagram of the circuit of Figure 13 with the gate of the present invention substituted for the gate 138 of Figure 13.

In connection with Figure 15, those parts which are identical with corresponding parts of Figure 13 bear like reference numbers. There are two generators of power pulses PP–1 and PP–2 which have the waveforms shown in Figure 16. These generators are constant potential sources, that is they have good voltage regulation. However, there is a resistor 171 of such high resistance that when either of coils 172 or 173 have low impedance little current flows to input 162 of amplifier 139. Resistor 171 is in series with source PP–1. When coils 172 and 173 have high impedance, ample current flows from source PP–1 through resistor 171 to energize the input 162 of amplifier 139 and to cause the latter to produce an output pulse all as described in connection with Figure 13. There are also input pulses at inputs 130 and 131, received from the magnetic store, which are the same and occur at the same time periods as the input signals 130 and 131 of Figure 14. Whenever input signals are received concurrently on wires 130 and 131, the magnetic gate 170—178 will allow a pulse from source PP–1 to flow to wire 162 and to the input of amplifier 139. In the absence of a pulse on either of inputs 130 or 131, the magnetic gate 170—178 will not allow a pulse to flow from source PP–1 to the wire 162. Normally the coils 172 and 173 will have low impedance for the reason that they will not be reset during the spaces between pulses from source PP–1. Hence, power pulses from source PP–1 will saturate both core 179 and core 180 in the absence of pulses on inputs 130 and 131. When either one of coils 172 or 173 has low impedance, the lower end of resistor 171 is effectively grounded and no current flows from source PP–1 to the input 162 of amplifier 139. In event a pulse appears on input 130 alone, the core 179 will be reset during the spaces between power pulses of source PP–1. Coil 172 will then present high impedance to the next pulse from source PP–1 but coil 173 will still have low impedance. It is only when concurrent pulses appear on both inputs 130 and 131 that both cores 179 and 180 are reset and pulses from source PP–1 thereupon allowed to flow to the output 162.

It is noted that by inserting the magnetic gate of the present invention for conventional diode gates, the output 162 from the gate has been displaced by one time period with respect to the input. Therefore, in order to prevent this from having an adverse effect upon the half-adder circuit, it is necessary to delay the pulses that would normally appear at the input of complementing magnetic amplifier 135 by one time period, and consequently the non-complementing magnetic amplifier 262 is placed in series with the input 152 of the complementing magnetic amplifier 135. It is clear from the foregoing description that the pulses received on wires 152 and 162 are identical with the pulses received at the inputs of amplifiers 135 and 139 of Figure 13, the only difference being that the pulses in Figure 15 are displaced from those of Figure 13 by one time space.

A second source of power pulses PP–2 is therefore employed in connection with amplifiers 135 and 139 of Figure 15 so as to properly amplify the delayed pulses which are received by those amplifiers and as a result the outputs on wires 137 and 139*b* of Figure 15 are identical with those on similar wires of Figure 13 except displaced by one time period.

Figure 16:
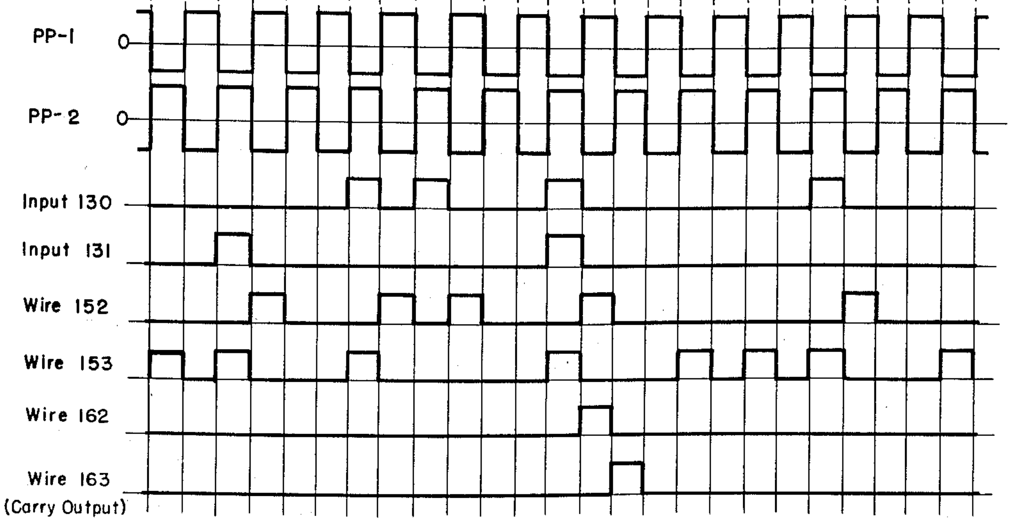
Figure 16 is a waveform diagram of the device of Figure 15.

The waveform diagram of Figure 16 clearly shows the relations of pulses in the device of Figure 15, and shows that the mode of operation of Figure 15 is substantially identical with that of Figure 13 except as hereinabove pointed out. In order to visualize the "sum" output of Figure 15, it is merely necessary to add together the pulses appearing on wire 153 of Figure 16 with those appearing on wire 163.

As shown in Figure 15, the source of pulses 164 may be a magnetic store or any other source of controlled pulses. If it is a magnetic store, it may be of any suitable type, and would have the several binary numbers stored therein in such a way that when the apparatus is in operation the binary signals emerging therefrom will be in the form of pulses appearing during the spaces between the pulses of source PP–1. This is clearly shown in Figure 16 where all of the pulses on inputs 130 and 131 appear during the spaces between pulses of source PP–1.

In event the device 164 is a mechanism other than a magnetic store, so that it is a trigger device which controls the flow of pulses to wires 130 and 131, it would normally be fed with pulses from source PP–2 since the pulses of this source appear during the gaps between the pulses of source PP–1. It is understood that in connection with a complete computing system embodying magnetic amplifiers, the two sources of power pulses PP–1 and PP–2 would normally be present and would supply pulses to a large number of different magnetic devices throughout the entire computer system, consequently each element such as 164, which might feed the input to the new gating system would normally be fed with power pulses from one of the two sources PP–1 or PP–2 contained in the over-all system. In adapting the gate to such a situation, it is merely necessary for the gate to be connected to the source of power pulses other than the one which supplies power pulses to the control element of which 164 is an example.

While the invention has been described broadly in connection with figures such as Figure 4, it is understood that it has a wide variety of detailed applications in computer circuits of which Figure 15 is one example. It is my intention to claim the invention not only as a separate element such as is shown in connection with Figure 4, but to claim it in combination with other elements as a part of a complete computer circuit or data translating system. Figure 15 is an example of such a combination which involves the novel gating system in a typical relation with other elements of a computer circuit.

Figure 8 has coils 41, 42, 43, 46 and 47; Figure 9 has coils 41, 42 and 43; Figure 10 has coils 41, 42 and 43; and Figure 15 has coils 41 and 42, all of which serve the same function as coils 41, 42 and 43 of Figure 4.

Hereinabove in connection with all of the figures, reference has been made to a "constant current source." It is not essential that the current from the sources be absolutely constant, in fact wide variations are permissible. However, this term is used to distinguish the source from a constant potential source of good voltage regulation under varying load. The constant current source may be of any well known type, but the simplest form of such a source is a resistor, such as the resistor 109 of Figure 10, in series with a constant potential source, for example a battery, or as here, a source of pulses of constant voltage. If the value of the resistance 109 is large as compared to the resistance of the windings on the magnetic amplifiers and the resistance of the load, it is obvious that changes in the impedances of the power windings in the load will not radically affect the over-all current flowing through the resistor 109.

Any of the hereinabove described circuits may be arranged to operate as either a magnetic gate or a magnetic buffer. A gate is herein considered as a device wherein there is a signal output at the load only where there are similar predetermined inputs at all of the signal sources of the device. For example, if all the signal sources had signals thereon occurring concurrently and if this produced an output at the load, the device would be acting as a gate.

The device would be acting as a buffer if a signal (or the lack of a signal) at any one of the signal inputs appears at one of the output connections either in complemented or non-complemented form, without appearing at any other signal input.

By virtue of specific examples showing both arrangements, the devices may produce outputs in response to predetermined pulses at one or more inputs or in the absence of predetermined pulses at one or more inputs. In some computer circuits it is desirable to have a particular indication in response to the absence of a signal the same as in other situations it is desirable to have the output in response to the presence of a signal. Variations to meet these circumstances have been hereinabove illustrated and described.

As stated earlier in this application, the present invention has limited applications in connection with computing and data translating systems, the principal components of which are magnetic amplifiers of the type shown in Figures 1 and 12. Such applications of the invention are shown in Figure 15. However, the more important applications of the invention are in connection with computing systems in which the principal components are magnetic gates and in which amplifiers of the type shown in Figures 1 and 12 (if used at all) would be only incidental components.

In order to understand more fully this phase of the invention, it is understood that a computing or data translating system may consist of combinations of gates of the type shown in this application; or, as would be more often the case, combinations involving gates as shown in this application together with gates shown in my aforesaid prior copending application Serial No. 461,968, filed October 13, 1954, entitled: "Gating Circuits Employing Magnetic Amplifiers." Examples of components of a computer circuit involving series gating, as shown in the aforesaid copending application, in combination with parallel gating, as shown in this application, are clearly illustrated in Figure 19 of the aforesaid prior copending application Serial No. 461,968, filed October 13, 1954. In that figure it is noted that there are coils which are connected in series with each other and which, taken together, constitute a short-circuit across the sum output (which may be regarded as the load) when both cores have low impedance. This is a typical illustration of an application of the parallel gating principle of this application.

I claim to have invented:

1. An electrical circuit comprising a load, a source of spaced current pulses, said source including means for maintaining the current output thereof substantially constant during variations in impedance in the circuit fed thereby, a load normally fed by said source, and means including a plurality of magnetic amplifiers each having an input for diverting current from the load through at least one of the magnetic amplifiers in response to predetermined input conditions, said magnetic amplifiers being disposed in a plurality of circuit branches each of which shunts said load, with at least one of said branches including a plurality of series-connected amplifiers.

2. An electrical circuit comprising a source of regularly spaced pulses; a plurality of magnetic amplifiers each having a saturable core, a power winding on the core, and input means operable to reset the cores during the spaces between the aforesaid pulses in response to a predetermined input condition, a load, and a plurality of parallel branch circuits connected across the source with the said load being disposed in a branch separate from said power windings, at least one of said branch circuits including a plurality of interconnected power windings at least some of which are in series with one another, whereby the relationship between the shunt impedance of said one of said branch circuits and the impedance of said load is dependent upon the relationship between the joint impedance of said interconnected power windings in said one of said branch circuits and the impedance of said load.

3. An electrical circuit as defined in claim 2 in which said power windings are disposed in a plurality of separate parallel branch circuits, a rectifier in series with each branch circuit to allow current from the source to flow through the said branch circuits having power windings with low impedance and to block the flow of current induced in the said power windings.

4. An electrical circuit as defined in claim 2 in which all said power windings in said one of said branch circuits are interconnected in series with each other, and a rectifier in series with said one of said branch circuits to allow current to flow from the source through all of the windings of said one of said branch circuits when they all have low impedance and to block flow of current induced in the power windings of other of said branches.

5. An electrical circuit as defined in claim 2 in which said branch including said load includes a rectifier connected in series with said load to allow current from said source to flow through said load when the other of said plurality of said branches have a high impedance and to block the flow through said load of current induced in said power windings during reset of said cores by said input means.

6. An electrical circuit comprising a constant current source and a load in parallel with each other, and a circuit in parallel with the load for shunting current away from it, a plurality of magnetic amplifiers each having a power winding, said power windings being connected in said circuit in series with each other, each magnetic amplifier having a saturable core, a control winding on each core, and means for supplying pulses to the control winding to control the resetting thereof.

7. An electrical circuit as defined in claim 6 in which the last-named means consists of signal pulse sources for producing signal pulses that directly reset the cores.

8. An electrical circuit as defined in claim 6 in which the last-named means includes means for normally resetting the core in the absence of a signal pulse and which effects cancellation of the resetting effect in response to a signal pulse.

9. The combination of claim 6 including a further circuit in parallel with said load and said first-mentioned circuit, said further circuit including a different number of magnetic amplifiers from the number of amplifiers comprising said plurality of amplifiers in said first-mentioned circuit.

10. An electrical circuit as defined in claim 6 which includes on each of said cores a setting winding and means to supply constant current pulses to said setting winding.

11. An electrical circuit as defined in claim 6 in which said constant current source produces spaced pulses during periods between the pulses supplied to said control windings and which includes a setting winding on each of said cores and means for supplying constant current pulses to said setting windings during periods between the pulses supplied to said control windings.

12. An electrical circuit comprising a source of spaced pulses, a plurality of magnetic amplifiers each having a saturable core, a power winding on each core, and input means operable to reset the cores during the spaces between the aforesaid pulses in response to a predetermined input condition, a load, parallel branch circuits across the source with the load being disposed in a branch separate from the power windings, said power windings being in at least one of said branch circuits whereby the impedances of the power windings determine the amount of current shunted away from the load, some of said power windings being in series with one another and being disposed in a first branch circuit which is in parallel with the load, a rectifier in series with said first branch circuit to allow current to flow therethrough from the source when the power windings in that branch all have low impedance and to block any flow of current induced in other of said power windings, a second branch circuit in parallel with the first and including at least one more power winding constituting a part of one of said magnetic amplifiers, and a rectifier in the second branch circuit to allow current from the source to flow therethrough when the second branch circuit has low impedance and to block any flow of current induced in the other of said branch circuits.

13. An electrical circuit comprising a load, first and second circuits connected in parallel with said load, a current source coupled to said load and to both said first and second circuits whereby the current flowing from said source to said load is dependent upon the shunting impedances exhibited by said first and second circuits, magnetic amplifiers in each of said first and second circuits, the number of magnetic amplifiers in said first circuit being different from the number of magnetic amplifiers in said second circuit, and control means coupled to said magnetic amplifiers for controlling the impedances of said first and second circuits.

14. An electrical circuit comprising a load; a plurality of magnetic amplifiers; each of said amplifiers comprising a saturable core, a power winding on said core, and a control winding on said core; means connecting said power windings to shunt said load; a source of regularly occurring pulses of alternating polarity; means connecting said source to said load and to said shunting power windings; means for selectively energizing said control windings during the time periods when said pulses are of a first polarity to apply a magnetomotive force to corresponding cores in a first direction and of magnitude to substantially saturate said cores in said first direction; and rectifier means in series with said power windings and poled to block said first polarity pulses and to pass pulses of opposite polarity through said power windings; the sense of linkage of said power windings and the energization thereof by said opposite polarity pulses being such as to tend to substantially saturate the respective cores in a second direction so that said power windings exhibit a low impedance to pulses of said opposite polarity in the absence of energization of said control windings thereby to shunt said opposite polarity pulses from said load, and said rectifier means being back biased by pulses of said first polarity to oppose induced current in one of said power windings due to current in one of said control windings.

15. An electrical circuit as defined in claim 14 in which each of said magnetic amplifiers includes a setting winding energized during pulses of said opposite polarity to apply to said cores a magnetomotive force in said second direction whereby said last-named magnetomotive force in combination with the magnetomotive force applied by current flow in said power windings during pulses of said opposite polarity is effective to saturate said cores in a second direction.

16. An electrical circuit as defined in claim 14 in which said source is a constant current source and in which said means connecting said source to said load includes a complementing magnetic amplifier.

17. An electrical circuit comprising a load, a source of regularly occurring alternate polarity pulses, means connecting said load to said source in a series circuit, said series circuit including a diode poled to allow current flow in said load in response to pulses of a second polarity only from said source, a plurality of magnetic amplifiers each having a core with a substantially rectangular hysteresis characteristic, a control winding and a power winding, means for selectively energizing each of said control windings in response to separate input signals to cause corresponding ones of said cores to be energized to a first remanent state, means connecting a single power winding only of each of said cores both in shunt circuit with said load and in circuit with said source, said power windings presenting a relatively high impedance to pulses of said second polarity when the corresponding cores are set to one remanent state and a relatively low impedance when said cores are in an opposite remanent state so that the current through said load from pulses of said second polarity is a function of the remanent state of said cores as established by said input signals, and rectifier means in each shunt circuit of said power windings poled to block said first polarity pulses and pass said second polarity pulses, said rectifier means and said first polarity pulses being operative to prevent current flow in said power windings in response to energization of corresponding control windings.

18. An electrical circuit comprising a load; a plurality of magnetic amplifiers; each of said amplifiers comprising a saturable core, a power winding on said core, and a control winding on said core; a source of regularly occurring pulses of alternating polarity; means connecting a single power winding only of each of said cores in shunt circuit with said load and in circuit with said source; means for selectively energizing said control windings during the time periods when said pulses are of a first polarity to apply a magnetomotive force to corresponding cores in a first direction and of magnitude to substantially saturate said cores in said first direction; and rectifier means in series with said power windings and poled to block said first polarity pulses and to pass pulses of opposite polarity through said power windings; the sense of linkage of said power windings and the energization thereof by said opposite polarity pulses being such as to tend to substantially saturate the respective cores in a second direction so that said power windings exhibit a low impedance to pulses of said opposite polarity in the absence of energization of said control windings thereby to shunt said opposite polarity pulses from said load, and said rectifier means being back biased by pulses of said first polarity to oppose induced current in one of said power windings due to current in one of said control windings.

19. In an electronic computer circuit operating on the binary principle; first and second sources of alternating polarity pulses of opposite phase relationship; computer means controlled by first polarity portions of said pulses and including a plurality of circuits respectively carrying some of said first polarity pulses of said first source in a form representative of binary numbers; said computer means including a load having an element to be controlled; a plurality of magnetic amplifiers; each of said amplifiers comprising a saturable core, a power winding on said core, and a control winding on said core; means connecting said power windings to shunt said element; means connecting said second source to said element and said shunting power windings; means for selectively energizing said control windings during the time periods when the pulses of said second source are of another polarity opposite said first polarity to apply a magnetomotive force to corresponding cores in a first direction and of magnitude to substantially saturate said cores in said first direction; and rectifier means in series with said power windings and poled to block said other polarity pulses and to pass pulses of said first polarity through said power windings; the sense of linkage of said power windings and the energization thereof by said first polarity pulses being such as to tend to substantially saturate the respective cores in a second direction so that said power windings exhibit a low impedance to pulses of said first polarity in the absence of energization of said control windings to thereby shunt said opposite polarity pulses from said element, and said rectifier means being back biased by pulses of said other polarity to oppose induced current in one of said power windings due to current in one of said control windings.

20. In an electronic computer circuit operating on the binary principle; first and second sources of alternating polarity pulses of opposite phase relationship; computer means controlled by first polarity portions of said pulses and including a plurality of circuits respectively carrying some of said first polarity pulses of said first source in a form representative of binary numbers; said computer means including a load having an element to be controlled; and means for shunting current away from said element comprising a plurality of magnetic amplifiers, one for each of said circuits, each of said amplifiers having a saturable core, a power winding and a control winding, means connecting said power windings to shunt said element, means connecting said second power source to said element and said shunting power windings, means for selecting energizing said control windings during the time periods when the pulses of said second source are of another polarity opposite said first polarity to apply a magnetomotive force to corresponding cores in a first direction and of magnitude to substantially saturate said cores in said first direction, and rectifier means in series with said power windings and poled to block said other polarity pulses and to pass pulses of said first polarity through said power windings, the sense of linkage of said power windings and the energization thereof by said first polarity pulses being such as to tend to substantially saturate the respective cores in a second direction so that said power windings exhibit a low impedance to pulses of said first polarity in the absence of energization of said control windings to thereby shunt said opposite polarity pulses from said element, said rectifier means being back biased by pulses of said other polarity to oppose induced current in one of said power windings due to current in one of said control windings.

21. An electronic computer as defined in claim 20 in which said power windings are respectively in branch circuits that are in parallel with each other and the load.

22. An electronic computer as defined in claim 21 having rectifiers in each of said branch circuits to allow shunting curent to flow through the branch circuit but to block flow of current, induced in said power windings, to the load.

References Cited in the file of this patent

UNITED STATES PATENTS

| | | |
|---|---|---|
| 2,719,962 | Karnaugh | Oct. 4, 1955 |
| 2,729,807 | Paivinen | Jan. 3, 1956 |

OTHER REFERENCES

AIEE Transactions, Part I, Communications and Electronics, pp. 442–446, January 1953.

Electrical Engineering, pp. 791–795, September 1953.

Thesis by R. C. Minnick, Computation Laboratory, Harvard Univ., Progress Report No. BL–3, placed on file at Harvard Library Sept. 16, 1953, pp. (5–14), (5–15), and (5–18).

UNITED STATES PATENT OFFICE

CERTIFICATION OF CORRECTION

Patent No. 2,966,662 December 27, 1960

Theodore H. Bonn

It is hereby certified that error appears in the above numbered patent requiring correction and that the said Letters Patent should read as corrected below.

Column 4, line 35, for "substantially" read -- substantial --; column 18, line 24, for "selecting" read -- selectively --.

Signed and sealed this 29th day of August 1961.

(SEAL)
Attest:

ERNEST W. SWIDER
Attesting Officer

DAVID L. LADD
Commissioner of Patents